MAX A. BIDEAU
CHARLES E. CHAUVETON
ALAIN FRUCHARD
MARC LAURENS
INVENTORS

BY Robert T. Cody

ATTORNEY

Sept. 19, 1972          M. A. BIDEAU ET AL          3,692,524
                PRINTING FROM COLOR TRANSPARENCIES
Filed Sept. 3, 1970                              3 Sheets-Sheet 3

MAX A. BIDEAU
CHARLES E. CHAUVETON
ALAIN FRUCHARD
MARC LAURENS
INVENTORS

BY Robert T. Cody

ATTORNEY

United States Patent Office 3,692,524
Patented Sept. 19, 1972

3,692,524
PRINTING FROM COLOR TRANSPARENCIES
Max A. Bideau, Joinville-le-Pont, Charles E. Chauveton, Villiers-sur-Marne, Alain Fruchard, Nogent-sur-Marne, and Marc Laurens, Clichy-sous-Bois, France, assignors to Eastman Kodak Co., Rochester, N.Y.
Filed Sept. 3, 1970, Ser. No. 69,204
Int. Cl. G03c 5/06, 7/04, 7/16
U.S. Cl. 96—6
1 Claim

ABSTRACT OF THE DISCLOSURE

High quality prints of a projection transparency may be inexpensively obtained by use of an unsharp black-and-white mask sandwiched over such transparency. The mask serves not only to sharpen the print image, but also to modify the overall contrast of the "sandwich," whereby printing may be made on color reversal paper. The mask material is in the nature of a web having adhesive areas to which transparencies stick; and the mask material is employed as a conveyor belt for transporting the transparencies.

BACKGROUND OF THE INVENTION

(1) Field of the invention

The present invention relates to an improved way to make paper prints from projection color transparencies.

(2) Description relative to the prior art

Color prints produced from projection transparencies are (usually) produced by one of two known processes: viz. (1) by enlarging the image of the transparency directly onto reversal photographic paper, or (2) by enlarging the image of the transparency onto color film which, after processing, produces a dianegative from which a color print may be obtained on positive color paper.

With the first of the above-noted techniques, one obtains color prints having mediocre definition, but at comparatively low cost. With the second of the above-noted techniques, better quality obtains, but at comparatively high cost.

The making of a photographic print from a color transparency is more difficult than might appear at first blush because the transparency to be copied necessarily has characteristics which, while making it useful for purposes of projection, prevent its susceptibility to the making of quality paper prints: Transparencies have a wide density variation, of the order of 2.5, which must be compressed to about 2 or less, i.e. the customary density range for prints; and, transparencies display contrasts which increase as a function of density (except for a short constant range just before the maximum density) . . . and to obtain a print which is pleasing to the eye, such contrast variations must be modified.

SUMMARY OF THE INVENTION

Photographic printing on paper of a "projection" image and, in particular, the printing on color reversal paper of the image of a color transparency is characterized, according to the invention, by the sandwiching of the color transparency with an unexposed black-and-white film so that the transparency and film are in registry a predetermined distance apart. The film is exposed through the transparency in order to form a latent image of the transparency which, after processing, provides a mask for the transparency. Exposure of color reversal paper is then made through the sandwiched transparency and mask, thereby to obtain after processing, a high quality print of the transparency image.

Apparatus according to the invention includes a supply compartment for a web of specially prepared unexposed mask-producing film; and loading station where transparencies are placed in correspondence with respective areas of the film web; a station for exposing the (emulsion coated underside of the) film web through the respective transparencies, thereby to produce latent images in the film web that correspond to the transparency image; and a processing station where the latent image of each "sandwich" is processed.

OBJECT(S) OF THE INVENTION

To obtain, from color projection transparencies, color prints on reversal paper which display good definition and color quality.

The invention will be described with reference to the figures; wherein.

Figure 1:
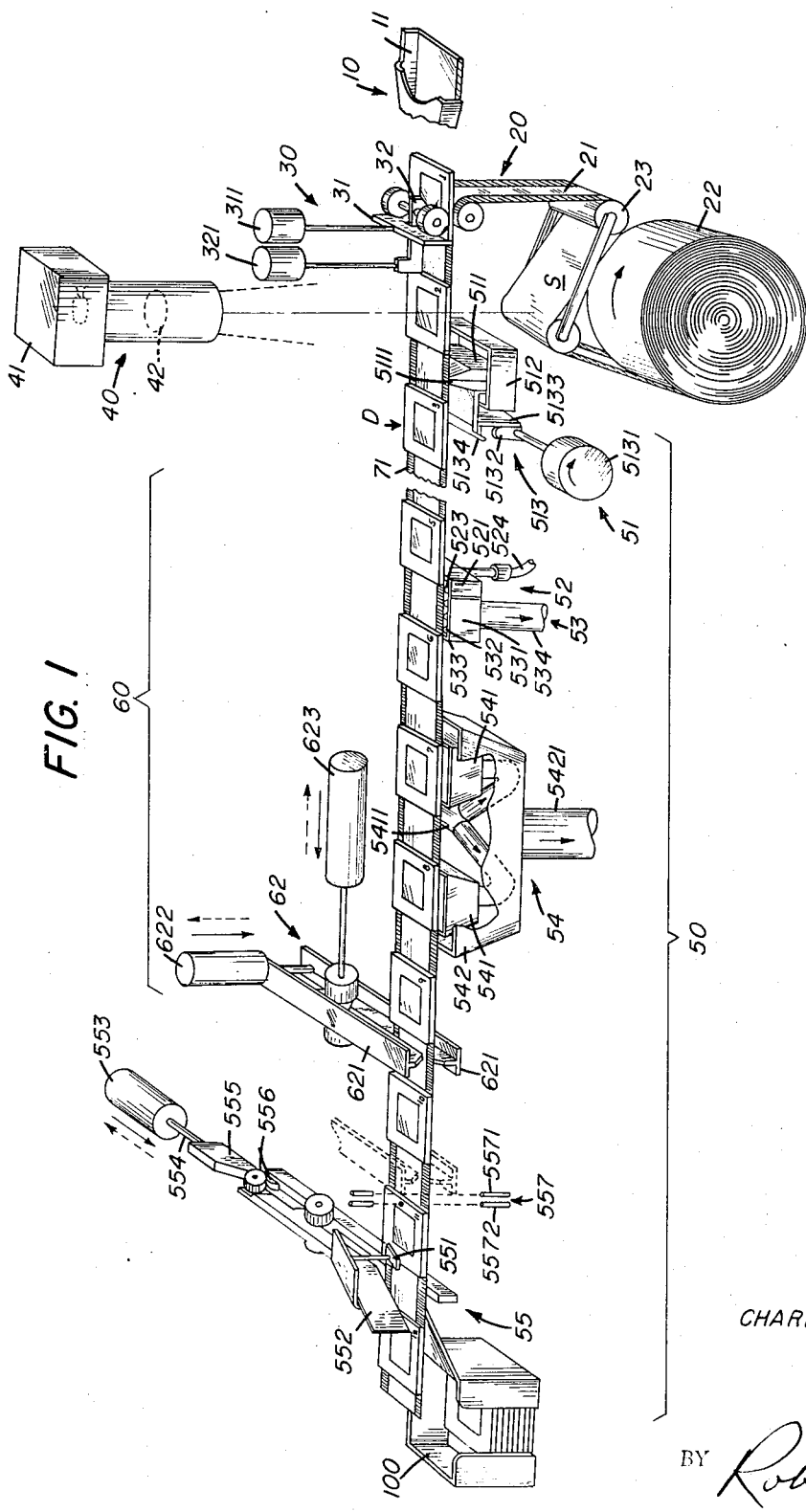
FIG. 1 is a perspective view illustrating an embodiment of the invention.

FIG. 1 indicates apparatus for the photographic printing of mounted transparencies D on color reversal paper; and such apparatus comprises a cassette 10, a supply compartment 20 for a web of unexposed mask film 21, and a loading station 30, wherein each transparency D exiting from the cassette 10 is placed in correspondence with a part of the mask film 21, thereby to form a respective sandwich of the transparency D and the mask film 21. The photosensitive side of the mask film is designated S. An exposure station 40 is provided for forming from the transparency of each sandwich a latent image in the mask film that corresponds to the transparency image. A processing station 50 cooperates to develop the latent image of each sandwich.

The cassette 10 comprises a feeding box 11 which supplies the loading station 30 with transparencies D. The supply compartment 20, which feeds the loading station 30 with unexposed mask film 21, comprises a roll 22—from which the unexposed mask film unwinds—and a web tension regulator 23.

The loading station 30, fed with transparencies D exiting from the cassette 10 and with masking film 21 exiting from the supply compartment 20, comprises a movable abutment member 31—controlled by a piston 311—and an applicator 32—controlled by a piston 321—which together assure the proper placing of the transparencies D with respect to the masking film. The arrangement of the loading station is such that the transparencies are arranged on the surface of the masking film which does not carry a photosensitive emulsion.

The exposure station 40 comprises a light box 41 and an optical system 42; and the processing station 50 comprises a developing agent distributor 51, a washer 52, a water-extractor 53, and a drier 54.

The developing agent distributor 51 is, according to the invention, movable and comprises a nozzle 511, a tank 512, and a mechanism 513. The nozzle 511 has a narrow transverse slot 5111, that is continuously fed with a developing agent by means of a pump, not shown. The developing agent which flows through the slot 5111 is collected in a recirculation tank 512; and the nozzle 511 is movable in a way that permits the developing agent to be applied to the latent image of the transparency that is formed in the masking film 21. The movement of the nozzle 511 is controlled by the mechanism 513 which comprises, essentially, a motor 5131 on the shaft of which a cam 5132 is mounted for actuating a right-angled brace 5133—movable on an axis 5134—that carries the nozzle 511.

The washer 52 comprises a rinser 521 having an idler roller 523 that is partially immersed in water that is supplied to the rinser by means of a hose 524.

The water-extractor 53 comprises a hood 531 having idler rollers 533. The hood 531 is connected, by means of a duct 534, with a suction unit in order to evacuate water collected by the rollers 533.

The drier 54 comprises a pair of enclosures 541 arranged within an outer enclosure 542. As is readily seen, the inner enclosures 541 are connected with a duct 5411; and the outer enclosure is connected with a duct 5421. The arrangement of the drier 54 is such that the inner enclosures blow relatively dry gas (air) on the mask film, and the outer enclosure collects the moisture-laden gas.

According to the embodiment shown in FIG. 1, the processing station also comprises a cutter 55. The cutter is provided with a pin element 551—connected to a movable member 552—and such pin element immobilizes the web of transparency and mask sandwiches while the masking film is chopped. The cutter 55 is controlled by a piston 553, the shaft 554 of which urges a wedge element 555 into cooperation with a wheel 556 that contacts the movable member 552 to effect the chopping operation. The cutter 55 is provided with a safety device 557 which prevents operation of the cutter whenever the web of transparency and mask sandwiches is improperly positioned with respect to the cutter. The safety device comprises two photosensitive cells arranged in such a way that the cells 5571 and 5572 are respectively excited, and not excited, when the edge of the transparency mounting is in the correct position for the cutting operation.

As is evident, the masking film serves as a conveyor belt, and a clasp 62 assures step-by-step movement of such "conveyor belt." The clasp comprises a pair of jaws 621, each disposed on an opposite side of the web, which move, on the one hand, perpendicularly to the web—so as to seize, or free, the web—under the action of a piston 622 and, on the other hand, intermittently parallel to the length of the web—at a given frequency—under the action of a piston 623.

The means for holding the sandwiched transparencies and masking film in registry consists of adhesive areas 71, and after the web of sandwiched transparencies and masking film has been chopped into discrete sandwiches, a receptacle 100 collects such sandwiches. Operation of the embodiment of FIG. 1 is as follows:

A sufficient length of masking film 21 is first threaded from the roll 22 to the receptacle 100; and then the apparatus is actuated. Each transparency D that exits from the feeding box 10 advances, step-by-step, at a predetermined frequency, the flow path being such that the transparencies D occupy the various successive portions indicated by the numbers 1 to 12, which appear in the lower right corner of each transparency mounting.

When a transparency D leaves the feeding box 11, it passes into the loading station 30, into contact with the movable abutment member 31, thereby to fix the position of the transparency D with respect to the applicator 32. The applicator 32 presses the transparency D against the lateral adhesives areas 71 of the masking film in such a way as to form a web of sandwiched transparencies and masking film, the withdrawal of the abutment member 31 being controlled by a photoelectric switch (not shown).

Immediately following the operation of the abutment member 31, the clasp 62 closes and the jaws 621, controlled by the piston 622, pinch the masking film. Then, the jaws 621 and the masking film web are moved in the direction of the web by the piston 623 as far as indicated in phantom: An exposure (at the location of the transparency D2) is then made of the transparency, thereby to form from the transparency an image on the masking film; and then the jaws 621 open. Such cycle of operation is repeated in response to each arrival of a transparency into the loading station 30. As is readily appreciated, the image formed in the masking film is blurred, i.e. unsharp, because the masking film is not in close contact with the transparency D, and because the image of the film web is formed by exposure of its photosensitive emulsion layer through its support.

Operation of the motor 5131 causes the slot 5111 of the nozzle 511 to swing so that a layer of developing agent is applied against and spread over the latent image of the masking film as it moves under operation of the piston 623; and when the masking film stops moving, the nozzle drops back into its withdrawn position.

When the transparency reaches the washer 52, the roller 523, which is partially immersed in water within the rinser 521, turns idly on its axis in response to friction of the masking film, and depositing a film of water to rinse the image; then, the masking film passes by the hood 531 wherein water is collected by the cylinders 533 and drawn off by the duct 534.

After the transparency exits from the drier 54, the clasp 62 operates to place the transparency in such a position that the transparency comes under the control of the safety device 557; as above noted, the device 557 controls the operation of cutter 55. And when the transparency is properly positioned, the masking film is cut, causing discrete sandwiches of transparency and masking film, still in registry, to fall into the receptacle 100. The discrete sandwiched transparencies and their respective masking films are then collected and fed to a conventional printer, wherein color reversal paper is exposed through such sandwiches, i.e. color reversal paper is exposed via the sandwich of a color transparency image and a blurred black-and-white dianegative image.

Figure 2:
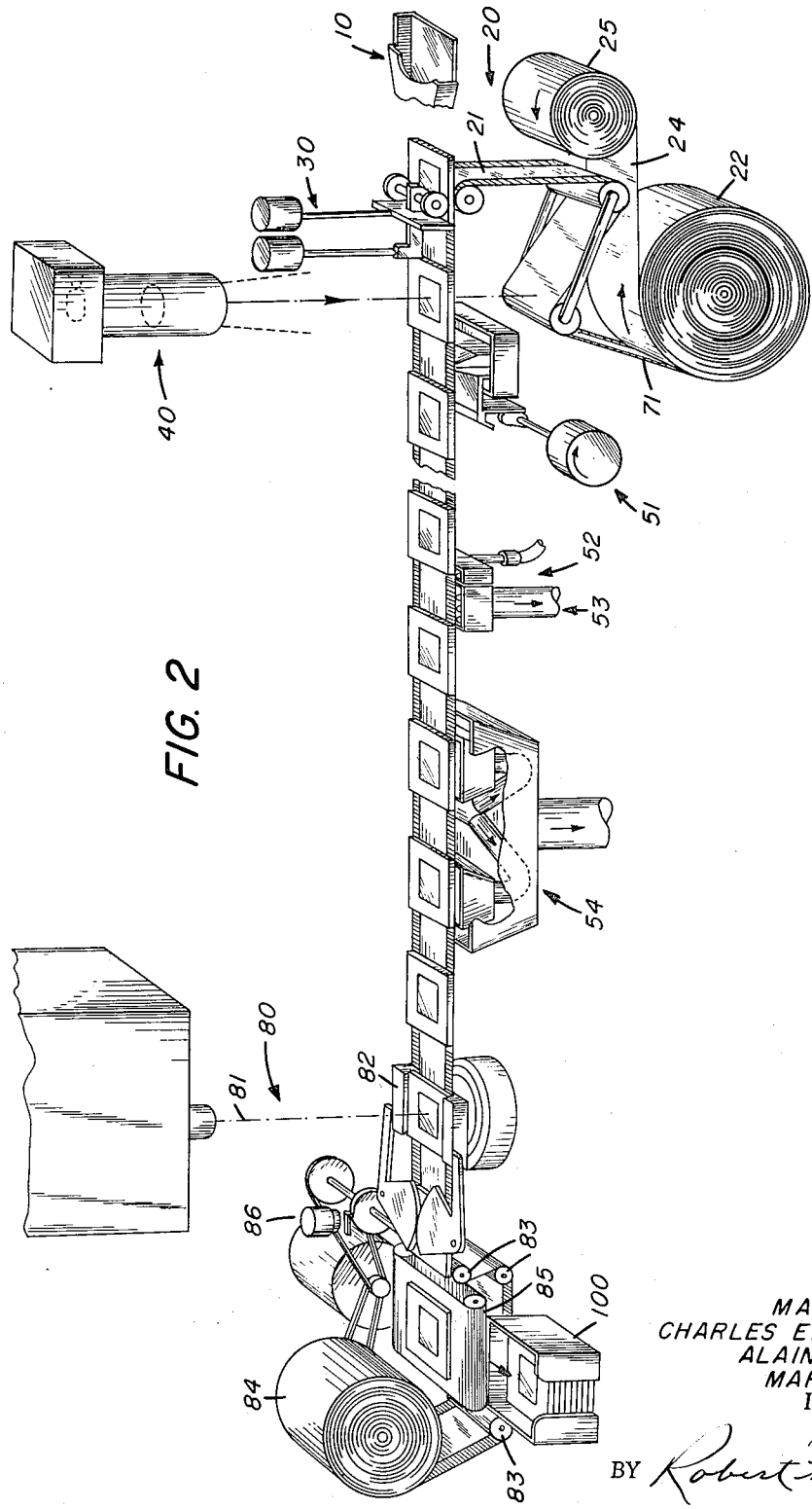
FIG. 2 is a perspective view of another embodiment of the invention.

Shown in FIG. 2 is a variation of the embodiment of FIG. 1, wherein the supply compartment 20 has been modified, and wherein the FIG. 1 cutter 55 and clasp 62 have been removed. In the embodiment of FIG. 2, the apparatus of the invention is directly associated with a printer 80 of any well-known type.

In the following description relating to FIG. 2, mention is made only of component parts, not described/ discussed in connection with FIG. 1.

The suply compartment 20 is loaded with a roll of masking film 21 which is provided, on its two edges, with adhesive areas 71. In order to facilitate the unwinding of the roll 22 and in order to prevent the successive layers of the roll from adhering to each other, silicon paper or the like is disposed between such layers, and such silicon paper unwinds simultaneously with the film 21 onto a takeup roll 25.

As masking film 21 exits from the drier 54, it passes into the printer 80, after which it is rewound onto a takeup roll 84.

The printer comprises pressure elements 82 which seize, one by one, the sandwiched transparencies and masking film, in order to immobilize them momentarily along the optical axis 81 of the printer. The system is provided with an endless belt 85 which moves in a direction orthogonal to that of the masking film; and such belt serves to feed toward the receptacle 100 the transparencies which have been separated from the masking film.

The operation of the embodiment of FIG. 2 is as follows:

When a transparency has reached the position indicated for the transparency D10, motion of the masking film 21 stops, the pressure elements 82, which had been open, close to immobilize the sandwiched transparency image and masking film for a period sufficiently long enough to allow an image to be produced in the color reversal paper (not shown). After the exposure has been made, the pressure elements 82 are opened, freeing the masking film 21 to follow a path over the return rollers 83; and while the masking film 21 and the transparency gradually separate, the transparency moves onto the endless belt 85 for transportation to the receptacle 100. The operation of the pressure plate 82, the takeup roller 84, and the endless belt 85 are controlled by a transmission 86 in synchronism with the other component parts of the FIG. 2 apparatus.

Figure 3:
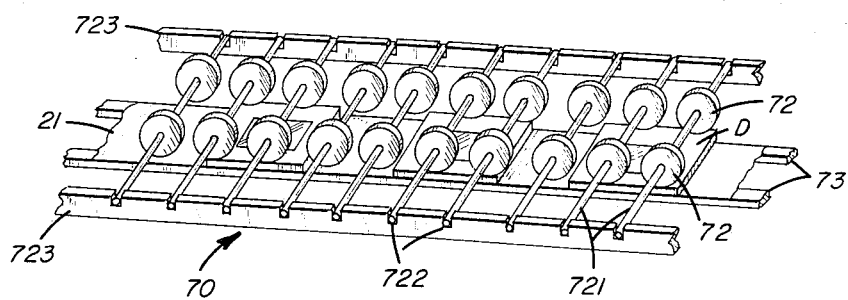
FIG. 3 is a perspective view illustrating apparatus according to still another embodiment of the invention.

FIG. 3 shows a partial detailed view of another embodiment of the invention, and in which embodiment the means for maintaining the sandwiched transparencies and masking film in registry comprises—from the loading station 10 to the printer 80—a system of rolls 72 that bear against the transparency mounts so that the transparencies cannot move with respect to the masking film. As may be seen in FIG. 3, the masking film 21 is stretched over spaced-apart lateral sliding rails 73; and the rolls 72 are mounted on axles 721 inserted into slots 722 cut into side bars 723 arranged on each side of the masking film. The dimensions of the slots are such that the axles can move vertically. Springs or the like (not shown) bias the rolls 72 toward the sliding rails.

With the apparatus/processes of the invention, in order to obtain quality prints on color reversal paper, an unsharp black-and-white negative mask is superimposed over the color transparency image, thereby causing not only sharpens in the detail of such prints, but also causing the contrast which is seen by the color reversal paper to be lowered in those regions where it would otherwise appear (undesirably) higher.

The invention has been described in detail with particular reference to preferred embodiments thereof, but it will be understood that variations and modifications can be effected within the spirit and scope of the invention.

What is claimed is:
1. The method of making photographic articles from which may be made color prints on reversal paper, comprising the steps of:

(a) intermittently conveying, past a series of stations, a web of photographic film that has adhesive, along the opposing edges of the web, and on the web side thereof which is opposite the photosensitized side of the web, (b) successively feeding transparencies onto the adhesive-bearing side of the web so that said transparencies stick to said web so that they may be carried along by said web, past said stations, in fixed relationship with respective parts of said web, (c) exposing, at a first one of said stations, said photosensitized side of said web through both said transparencies and said web, then (d) spreading, at a second one of said stations, a photographic developing agent over the exposed photosensitized side of said web, then (e) washing, at a third one of said stations, said exposed photosensitized side of said web, and (f) cutting at a fourth one of said stations, said web to produce discrete sandwiches of transparencies with respective masks.

References Cited
UNITED STATES PATENTS

| | | | |
|---|---|---|---|
| 2,596,677 | 5/1952 | Goslin et al. | 96—6 |
| 2,409,976 | 10/1946 | Dean | 96—6 |
| 2,420,636 | 5/1947 | Yule | 96—44 |

NORMAN G. TORCHIN, Primary Examiner

A. T. SURO PICO, Assistant Examiner

U.S. Cl. X.R.

96—23, 44